June 11, 1957
I. H. LEHMAN
2,795,359
LIQUID METERING DEVICE
Filed March 5, 1954
5 Sheets-Sheet 2
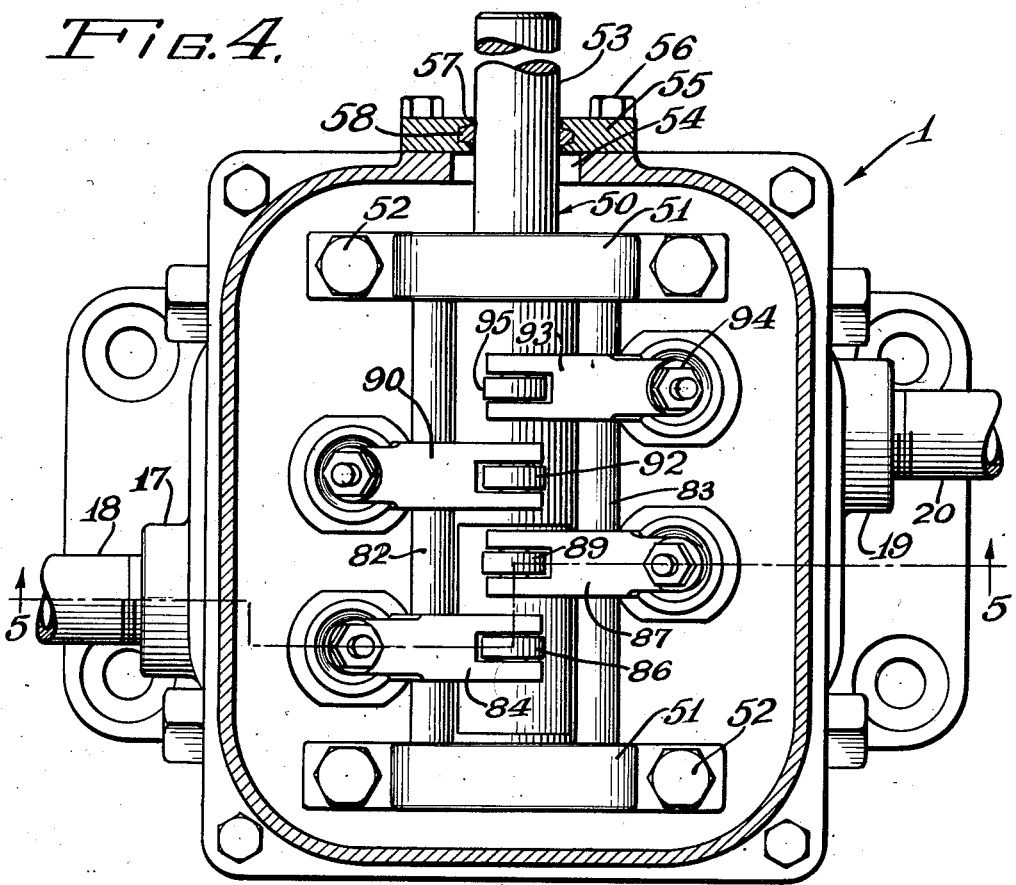
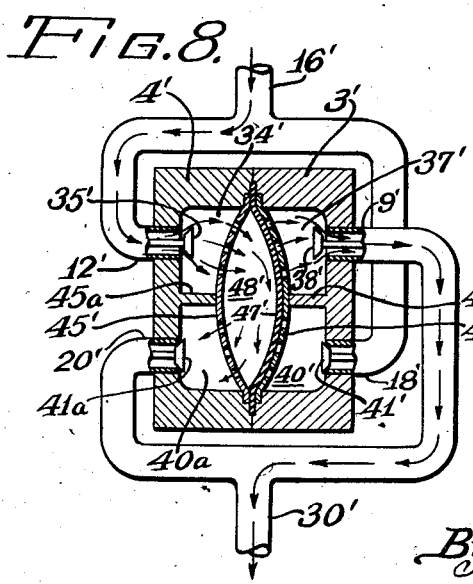
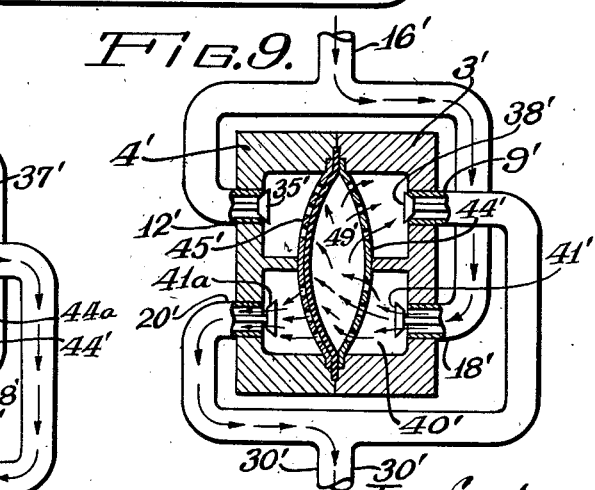
Inventor:
Irvin H. Lehman
By Gary, Desmond & Parker
Attys.

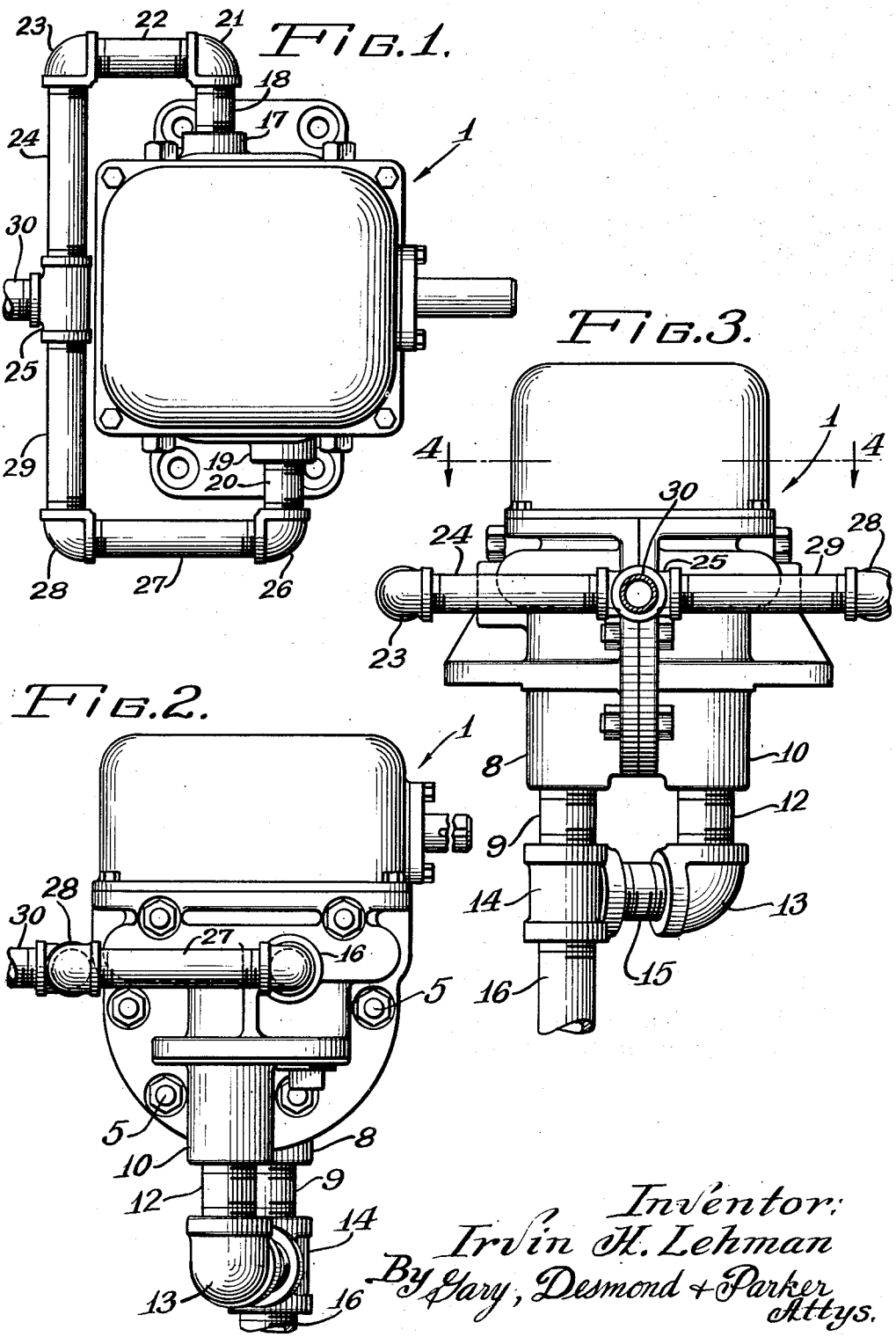

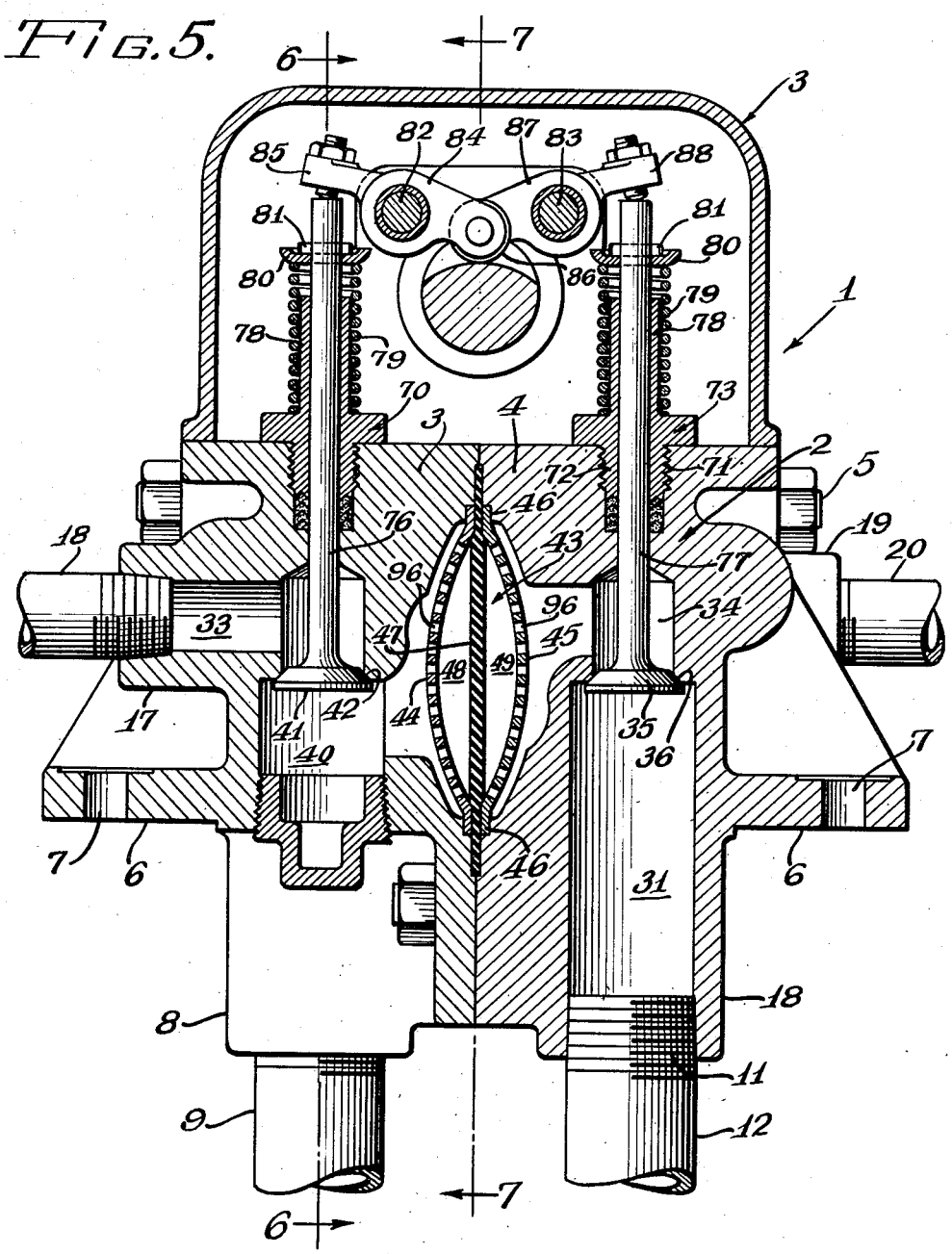

June 11, 1957

I. H. LEHMAN 2,795,359

LIQUID METERING DEVICE

Filed March 5, 1954

Inventor:
Irvin H. Lehman
By Gary, Desmond & Parker
Attys.

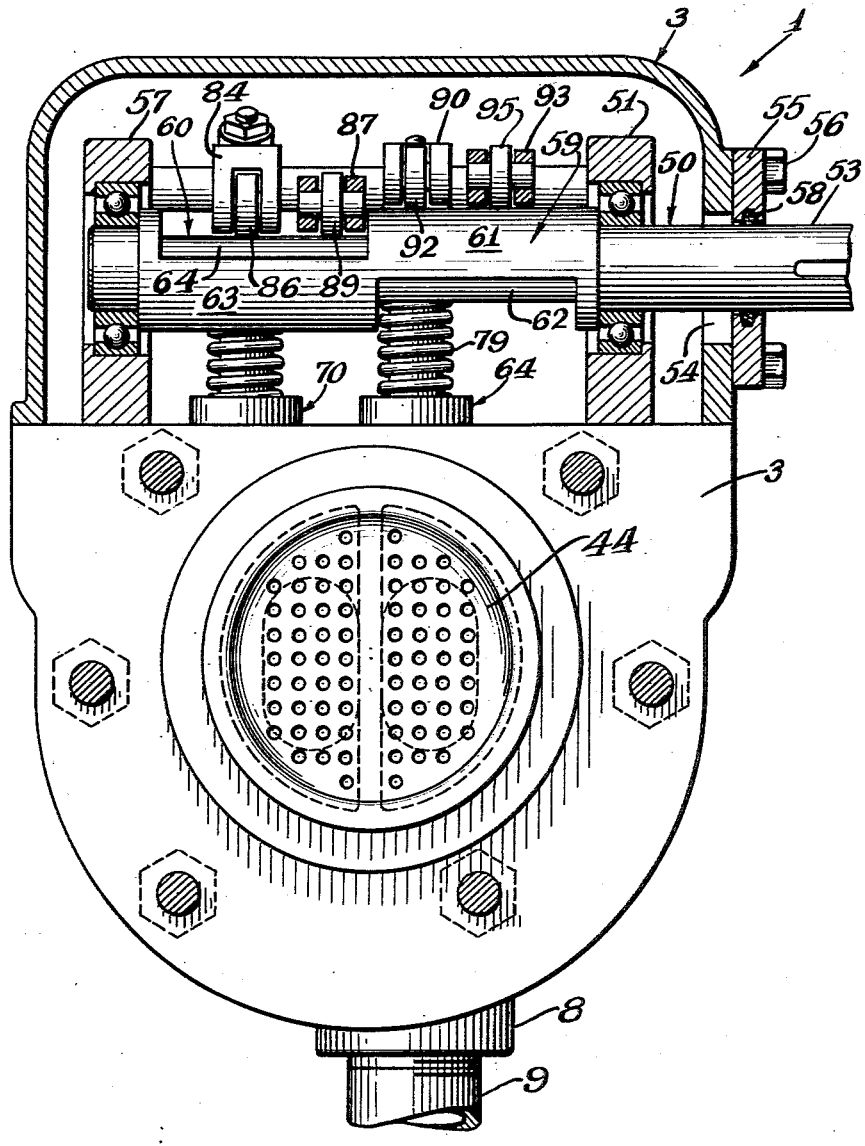

United States Patent Office 2,795,359
Patented June 11, 1957

2,795,359

LIQUID METERING DEVICE

Irvin H. Lehman, Kentland, Ind.

Application March 5, 1954, Serial No. 414,327

5 Claims. (Cl. 222—249)

This invention relates to improvements in a liquid proportioning device and is particularly directed to a rapid, positively operating device which will accurately measure and dispense liquid in a series of equal increments proportional in number to the rotary speed of a rotating body.

One of the most effective ways of fertilizing soil is to apply anhydrous ammonia in the form of a gas directly to the soil. One of the difficulties, however, in the application of the ammonia gas resides in the problem of proportioning the gas to a predetermined acreage of land. At elevated pressures, that is, pressures above about 40 pounds per square inch the ammonia gas can be maintained in the liquid state. Hence, in measuring or proportioning the material it is desirable to measure or proportion it in the liquid state, then release the pressure and distribute the material in the gaseous state in the soil.

In distributing the fertilizing material, a farm vehicle is employed which carries a bulk supply of ammonia under liquefying pressure; a proportioning device is connected to the bulk supply whereby the liquid ammonia is measured and ground-penetrating blades are carried by the vehicle which have conduits or tubes which open at their ends, said conduits or tubes being connected to the proportioning device whereby the liquid ammonia is passed through the tubes to be discharged as a gas adjacent the ends of the blades.

Leakage of the ammonia has heretofore been a serious obstacle to the dispensing thereof. The bulk supply of ammonia is usually maintained under pressures of between about 40 to 200 pounds per square inch and, hence, the proportioning device must be of such character as to remain sealed under said pressures. Piston and cylinder arrangements have heretofore been employed as proportioning devices, but leakage is so severe that expensive sealing means must be employed to render the device usable. Barrel-type valves have also been employed, but inasmuch as the barrels are substantially in continuous operation, wear is excessive and leakage invariably results after short usage. In view of the fact that ammonia fumes are most obnoxious and even dangerous, it can readily be seen that the proportioning and distribution of the ammonia has posed a most serious problem in this method of fertilizing.

The present invention relates to a device of the class described wherein cam-operated poppet valves are employed to control the passage of ammonia under pressure to and from completely sealed proportioning chambers, the cam for operating the valves being operated in timed relationship to the movement of a farm vehicle which carries the bulk supply of ammonia, the proportioning device and the dispensing blades.

The poppet type of valve is eminently suitable for this type of device since it will withstand high pressures, the wear under continuous conditions of operation is negligible and the valves may readily be timed to operate in conjunction with the travel of a conveying vehicle.

It is to be understood that, although the present device is ideally adaptable for proportioning ammonia in the liquid state it can be used to proportion any fluid in liquid form, particularly where the liquid may be highly volatile and wherein the proportioning operation is a continuous operation and where speed of operation is also a factor.

Other objects and advantages of the present invention will be apparent from the accompanying drawings and following detailed description.

In the drawings:

Fig. 1 is a top plan view of the improved proportioning device.

Fig. 2 is an end elevational view of the device.

Fig. 3 is a side elevational view of the device.

Fig. 4 is an enlarged plan sectional view of the device taken on line 4—4 of Fig. 3.

Fig. 5 is a sectional view taken on line 5—5 of Fig. 4.

Fig. 7 is a sectional view taken on line 7—7 of Fig. 5.

Figs. 8 and 9 are diagrammatic views showing the sequential operation of the device.

Figure 6:
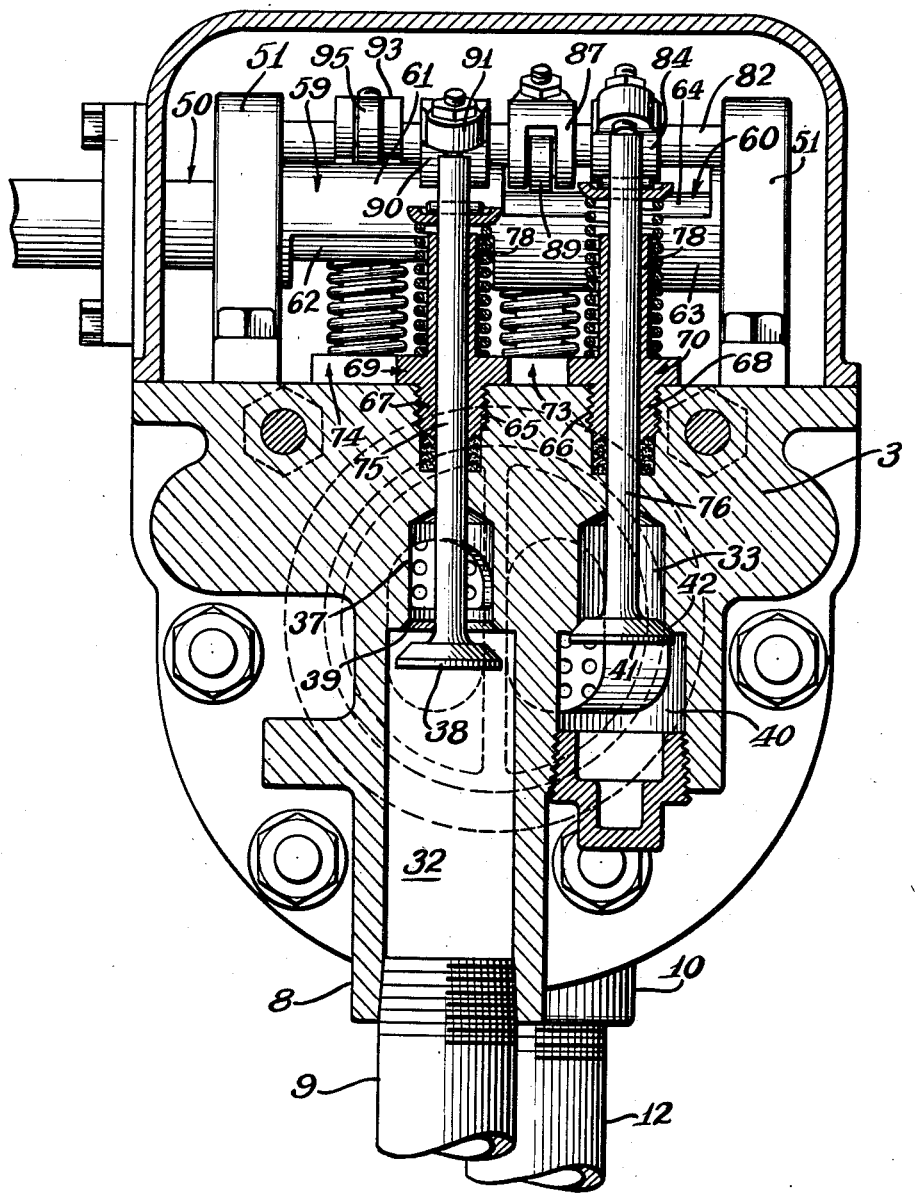
Fig. 6 is a sectional view taken on line 6—6 of Fig. 5.

Referring in detail to the drawings, 1 indicates generally the proportioning device comprising the present invention. The device comprises essentially a body 2 and a cover 3, the body comprising a pair of blocks 3 and 4, secured together by bolts 5. The cover 3 is removably mounted upon the top of the body and is adapted to enclose a cam shaft and valve tappets, as will be hereinafter more fully described. Base flanges 6 are formed as portions of the blocks 3 and 4, said flanges being provided with apertures 7 for the reception of bolts or screws whereby the device 1 may be mounted upon a suitable support. If the device 1 is to be employed in the proportioning of ammonia for fertilizing purposes, the device may be carried upon any suitable farm vehicle (not shown).

The block 3 carries a boss 8 which is internally threaded to receive a nipple 9. The block 4 carries a similar boss 10 which is also internally threaded to receive the threaded end 11 of a nipple 12. The nipple 12 is threadedly connected at its opposite end to an elbow 13 and the nipple 9 is threadedly connected at its end to a T fitting 14. A nipple 15 is threadedly connected to both the elbow 13 and T fitting 14 whereby nipples 9 and 12 are effectively connected to each other. A pipe 16 connects into the T 14 and, as will be hereinafter more fully described, said pipe constitutes the intake pipe to the proportioning device 1. Pipe 16 is connected at its opposite end to a source of liquid under pressure. For instance, if the device 1 is to be used as a proportioning device for an ammonia fertilizing system, the pipe 16 will be connected to a suitable source of ammonia under pressure. The ammonia may be confined in a tank (not shown) which in turn may be supported upon a suitable farm vehicle (not shown).

The block 3 also carries a boss 17 which is adapted to receive the threaded end of a nipple 18. Similarly, block 4 carries a boss 19 adapted for the reception of a threaded end of a nipple 20. Nipple 18 is threadedly connected at its opposite end to elbow 21 which in turn is connected to pipe 22. Pipe 22 connects with elbow 23 which, in turn, connects with pipe 24, the opposite end of which connects into a T fitting 25. Similarly, nipple 20 connects into elbow 26 which, in turn, connects with pipe 27. Pipe 27 connects into elbow 28 which, in turn, is connected by pipe 29 to the T fitting 25. Thus, in effect, nipples 18 and 20 are connected together. A pipe 30 connects into the T fitting 25, said pipe constituting the outlet of the proportioning device 1.

If the device 1 is to be employed in the proportioning and dispensing of ammonia for fertilizing purposes, the pipe 30 may be connected to a suitable header (not shown) into which the tubes or conduits leading to the ground-penetrating blades may be connected whereby the proportioned and dispensed ammonia from the device 1 will be distributed in gaseous form into the soil.

The nipple 12 connects into a compartment 31 provided in block 4 and nipple 9 connects into a similar compartment 32 provided in block 3. Nipple 18 connects into compartment 33 provided in block 3 and nipple 20 connects into a similar compartment (not shown) provided in block 4. Compartment 31 is separated from an intake compartment 34, also provided in block 4, by valve 35 which operates in conjunction with a seat 36 to close communication between compartment 31 and 34. Compartment 32 is separated from a similar intake compartment 37 (Fig. 6) by valve 38 which cooperates with seat 39 to close communication between compartment 32 and compartment 37. Compartment 33 is separated from a compartment 40 in block 3 by a valve 41 which cooperates with seat 42 to close communication between said compartments. In block 4 the compartment corresponding to compartment 33 connects into a compartment similar to compartment 40 by a valve (not shown) similar to valve 41.

The abutting faces of blocks 3 and 4 are provided with registering recesses, which when the blocks are held in abutting relationship, provide a zone 43. A pair of spherical plates 44 and 45 are positioned in said zone, being confined at their edges 46 between said blocks. A flexible, resilient diaphragm 47 is positioned between the plates 44 and 45, the edges of the diaphragm being confined between the edges of the plates and between the blocks. The normal position of the diaphragm 47, which may be constructed of rubber or the like, is midway between the plates, thus dividing the zone 43 in spaces 48 and 49.

Outside of plate 44 two zones are provided which are separated by a partition plate (shown diagrammatically only in Figs. 8 and 9) which joins with the plate 44. Similarly, outside plate 45 two zones are provided, separated by a partition (shown diagrammatically only in Figs. 8 and 9) which is joined to plate 45. The compartment 40 connects with one of the zones outside plate 44 and the compartment 37 connects with the adjacent zone outside plate 44. Similarly the compartment 34 connects with one of the zones outside of plate 45 and the compartment corresponding to compartment 33 in block 4 connects with the adjacent compartment outside plate 45.

Thus, the intake nipple 9 effectively connects with one of the zones outside plate 44 and intake nipple 12 effectively connects with one of the zones outside of plate 45. In similar fashion the exhaust nipple 18 connects with the adjacent zone on the outside of plate 44 and the exhaust nipple 20 connects with the adjacent zone outside of plate 45. Thus, means is provided, controlled by valve 41 and valve 38 for effectively connecting the intake pipe 16 to space 48 or for effectively connecting exhaust pipe 30 to the space 48. Similarly, means is provided for connecting intake pipe 16 or exhaust pipe 30 to space 49, the communication being controlled by valve 35 and its companion valve corresponding to valve 41.

A cam shaft 50 is journaled in spaced bearing blocks 51 which are mounted upon the blocks 3 and 4 being secured thereto by means of screws or the like 52. An end portion 53 of the cam shaft 50 extends outwardly through an aperture 54 provided in the cover 3. A plate 55 is secured by means of screws 56 to the cover 3 adjacent the aperture 54, said plate being provided with a recess 57 through which the extending end 53 of the cam shaft 50 is positioned. A sealing ring 58 is carried by the plate 55 and effects a fluid-tight seal with the shaft 53.

If the device is employed for the ammonia fertilization of soil, the shaft may be mechanically connected to a portion of the running gear of the farm vehicle whereby movement of the vehicle results in proportional rotation of the shaft 53. As will be hereinafter more fully described the shaft 53 is adapted to operate the valves hereinbefore described in order to effect the proportioning of the liquid.

Between the blocks 51, the cam shaft 50 is divided into two sections 59 and 60. Section 59 of the cam shaft, for approximately 180° of its circumference is of relatively large radius as indicated at 61. The remaining portion of the section 59 is of relatively restricted radius as indicated at 62. Similarly, the section 60 is provided with a portion 63 of relatively large radius and a portion 64 of relatively restricted radius. In other words, each section 59 and 60 carries cam surfaces having high portions and low portions. The arrangement is such, however, that the high portion of section 59, that is, the portion 61 is opposite the high portion 63 of section 60 and the low portion 62 of section 59 is opposite the low portion 64 of section 60. The purpose of this arrangement will be hereinafter more fully described.

In block 3 a pair of threaded recesses 65 and 66 are provided for the reception of the threaded ends 67 and 68 of sleeves 69 and 70 respectively. Block 4 is also provided with a similar pair of threaded recesses 71, one of said recesses being adapted for the reception of the threaded end 72 of a sleeve 73 and the other recess being adapted for the reception of the threaded end of a sleeve 74. Thus, two spaced sleeves 69 and 70 are positioned on one side of the cam shaft 50 and two spaced sleeves 73 and 74 are positioned on the opposite side of said cam shaft.

A valve stem 75 extends through sleeve 69 and also extends through the body of the block 3, said valve stem carrying at its lower end valve 38. Similarly, valve stem 76 extends through sleeve 70 and through block 3 and carries valve 41 at its lower end. A valve stem 77 extends through sleeve 73 and block 40 and carries valve 35 at its lower end. In similar fashion, a valve stem extends through sleeve 74 and through block 4 and carries a valve at its lower end.

Each of the sleeves 69, 70, 73 and 74 have upwardly extending tubular portions 78 which function as guide portions for the movement of the respective valve stems therein. A coil spring 79 embraces each of the tubular portions 78 and a washer 80 is positioned at the upper portion of each of the coil springs 79, each washer being fixedly positioned with respect to the length of the valve stem by means of a pin 81.

A rock shaft 82 is positioned on one side of cam shaft 50 and a similar rock shaft 83 is positioned upon the opposite side of said cam shaft, said rock shafts being journaled in the blocks 51. A rocker arm 84 is journaled upon the rock shaft 82 and has an end portion 85 which rests upon the upper end of valve stem 76. The opposite end of the rocker arm 84 carries a roller 86 which rides upon the cam shaft 50. A rocker arm 87 is journaled upon rock shaft 83 and one end 88 thereof rests upon the upper end of valve stem 77. The opposite end of rocker arm 87 carries a roller 89 which rides upon cam shaft 50. It will be noted that the rocker arms 84 and 87 are associated with valve stems 76 and 77 which are positioned on opposite sides of the cam shaft 50. The rocker arms 84 and 87 are positioned adjacent each other and hence both rocker arms cooperate with section 60 of the cam shaft. Thus, the rocker arms will be swung, about their respective shafts, at the same time by the cam surfaces 63 and 64. In other words, rollers 86 and 89 will simultaneously ride upon the same cam surface 63 or 64.

Mounted upon the same rock shaft 82 as is the rocker arm 84 is another rocker arm 90. An end portion 91 of the rocker arm 90 rests upon the upper end of valve stem 75. The opposite end of the rocker arm 90 carries a roller 92 which rides upon section 59 of the cam shaft 50. Adjacent the rocker arm 90 but mounted upon rock shaft 83 is a rocker arm 93 having an end portion 94 which rests upon the upper end of the fourth valve stem. The opposite end of rocker arm 93 carries a roller 95 which rides upon section 59 of the cam shaft 50.

The arrangement is similar to the arrangement hereinbefore described in conjunction with rocker arms 84 and 87, that is, the rollers 92 and 95 of the rocker arms 90 and 93 simultaneously rest upon the same cam surface of the section 59 of the cam shaft 50. Thus, the valves which are manipulated by the opposite rocker arms 90 and 93 are opened and closed at the same time.

The operation of the device can best be understood by reference to Figs. 8 and 9 wherein diagrammatic views are shown illustrating the parts in their different sequential positions. As far as possible, the parts in Figs. 8 and 9 will be designated with primed reference numerals corresponding to the parts hereinbefore described.

Each of the plates 44 and 45 are provided with a plurality of apertures 96 which afford communication into the spaces 48 and 49. Hence, when the intake pipe 16 is connected to a source of liquid under pressure adjacent valves in opposite blocks 3 and 4 will be opened and the remaining pair of adjacent valves in the opposite blocks will be closed. For instance, in Fig. 8, valves 35' and 38' are shown in open position. Hence, liquid under pressure will enter pipe 16' and will be passed through nipple 12' into the space 34'. At this phase of operation valve 41a will be seated and hence the pressure of the liquid entering compartment 34' will act to displace the diaphragm 47' from its normal central position to a position adjacent the spherical plate 45. During the normal operation of the device, the compartments 37' and 40' will have previously been filled with liquid. When the valve 35' is opened, valve 38' simultaneously opens and consequently the diaphragm 47', urged by the incoming liquid under pressure, will force the liquid through the space 49' outwardly through nipple 9' and into the discharge pipe 30'.

As the cam shaft 50 continues its rotation, valves 35' and 38' will close and valves 41a and 41' will open. By the opening of valve 41' liquid under pressure will enter from pipe 16' into compartment 40' and hence the diaphragm 47' which was previously positioned adjacent the plate 45' will be flexed in the opposite direction and will assume a position in conformation with plate 44'. Thus, the space 49' will be filled with liquid under pressure and the liquid which previously was confined in the space 48' and the compartments 34' and 40a will be expelled through nipple 20' and thence to the outlet 30'. Thus, at each cycle of operation, a volume of liquid will be discharged through the outlet 30' which is equal to the sum of the volumes of the spaces 48' and 49'. In this fashion, a measured volume of liquid will be discharged through the pipe 30' twice for one complete rotation of the cam shaft 50. If the device is employed as a metering mechanism for discharging ammonia into the soil, as the vehicle which carries the device moves forwardly a predetermined quantity of the ammonia will be discharged through the outlet 30 into the ground for a predetermined distance over which the vehicle travels due to the fact that the movement of the vehicle will be proportioned to the rotation of the cam shaft 50.

As has been herebefore described, and shown diagrammatically in Figs. 8 and 9, the space outside of each plate 44 and 45 may be divided into two zones. For instance, the space outside of plate 44' in Fig. 8 may be divided by partition 44a whereby zones 37' and 40' are formed, and the space outside of plate 45' may be divided by partition 45a whereby zones 34' and 40a are formed. In this construction the plates 44 and 45 will be reinforced by the partitions against the pressure of the liquid acting upon the diaphragm. However, if desired, the partitions may be eliminated without effecting the operation of the device as described.

I claim as my invention:

1. A metering device for liquid comprising, a body provided internally with a closed zone, a flexible, resilient diaphragm positioned substantially centrally of said zone dividing said zone into two closed compartments, a concavo-convex substantially rigid perforated plate positioned on each side of said diaphragm with the concave faces of said plates facing said diaphragm, inlet means for liquid under pressure connected to said body, outlet means for fluid connected to said body, a pair of poppet valves for controlling the passage of liquid under pressure from said inlet means to said compartments, a pair of poppet valves for controlling the passage of fluid from said compartments to said outlet means, and cam means for alternately opening one inlet poppet valve of a predetermined compartment and the outlet poppet valve of the other compartment and closing the remaining poppet valves to cause liquid under pressure from said inlet means alternately to displace said diaphragm into contact with the opposite concave faces of said plates, said cam means comprising a cam shaft journaled in said body and cams carried by said cam shaft for actuating said poppet valves when said cam shaft rotates in a predetermined direction.

2. A metering device for liquid comprising, a body provided internally with a closed zone, a flexible, resilient diaphragm positioned substantially centrally of said zone dividing said zone into two closed compartments, a concavo-convex substantially rigid perforated plate positioned on each side of said diaphragm with the concave faces of said plates facing said diaphragm and being substantially coextensive in area therewith, inlet means for liquid under pressure connected to said body, outlet means for fluid connected to said body, a poppet valve for controlling the passage of liquid under pressure from said inlet means to each of said compartments, a poppet valve for controlling the passage of fluid from each compartment to said outlet means, a cam shaft journaled in said body, cams carried by said cam shaft for alternately opening one inlet valve of a predetermined compartment and the outlet valve of the other compartment and closing the remaining valves to cause liquid under pressure from said inlet means alternately to displace said diaphragm into contact with the opposite concave faces of said plates when said cam shaft rotates in a predetermined direction.

3. A metering device for liquid comprising, a body comprising a pair of blocks secured together, each of said blocks being provided with a registering recess whereby a closed zone is provided when said blocks are secured together, a flexible, resilient diaphragm positioned substantially centrally of said zone and having its edges confined between said blocks, said diaphragm dividing said zone into two closed compartments, a concavo-convex substantially rigid perforated plate positioned on each side of said diaphragm with the concave faces of said plates facing said diaphragm and with the edges of said plates confined between said blocks, inlet means for liquid under pressure connected to said body, outlet means for fluid connected to said body, a pair of poppet valves for controlling the passage of liquid under pressure from said inlet means to each of said compartments, a pair of poppet valves for controlling the passage of fluid from said compartments to said outlet means, a cam shaft journaled in said body, cams carried by said cam shaft for alternately opening one inlet valve of a predetermined compartment and the outlet valve of the other compartment and closing the remaining valves to cause liquid under pressure from said inlet means alternately to displace said diaphragm into contact with the opposite concave faces of said plates when said cam shaft rotates in a predetermined direction.

4. A metering device for liquid comprising, a body provided internally with a closed zone, a flexible, resilient diaphragm positioned substantially centrally of said zone dividing said zone into two closed compartments, a concavo-convex substantially rigid perforated plate positioned on each side of said diaphragm with the concave faces of said plates facing said diaphragm, inlet means for liquid under pressure connected to said body, outlet means for fluid connected to said body, a poppet valve for controlling the passage of liquid under pressure from said inlet means to each of said compartments, a poppet valve for controlling the passage of fluid from each compartment to said outlet means, a rotatable cam shaft carried by said body, and cam follower means operated by said cam shaft for alternately opening one inlet valve of a predetermined compartment and the outlet valve of the other compartment and closing the remaining valves to cause liquid under pressure from said inlet means alternately to displace said diaphragm into contact with the opposite concave faces of said plates in timed relationship to the continuous rotation of said cam shaft in a predetermined direction.

5. A metering device for a relatively volatile liquid which vaporizes at normal pressures comprising, a body provided internally with a closed zone, a flexible, resilient diaphragm positioned substantially centrally of said zone dividing said zone into two closed compartments, a concavo-convex substantially rigid perforated plate positioned on each side of said diaphragm with the concave faces of said plates facing said diaphragm, inlet means for volatile liquid under liquefying pressures connected to said body, outlet means connected to said body for discharging said liquid into a zone of substantially atmospheric pressure, a pair of poppet valves for controlling the passage of liquid under liquefying pressure from said inlet means to compartments, a pair of poppet valves for controlling the passage of fluid from said compartments to said outlet means, and a cam shaft carrying cams for alternately opening one inlet valve of a predetermined compartment and the outlet valve of the other compartment and closing the remaining valves to cause liquid under pressure from said inlet means alternately to displace said diaphragm into contact with the opposite concave faces of said plates as said cam shaft continuously operates in a predetermined direction.

References Cited in the file of this patent

UNITED STATES PATENTS

| | | |
|---|---|---|
| 322,388 | Lord | July 14, 1885 |
| 1,122,270 | Goehring | Dec. 29, 1914 |
| 1,242,414 | Ashell | Oct. 9, 1917 |
| 2,576,747 | Bryant | Nov. 27, 1951 |

FOREIGN PATENTS

| | | |
|---|---|---|
| 271,154 | Switzerland | Jan. 3, 1951 |